United States Patent
Ku et al.

(10) Patent No.: US 7,346,004 B2
(45) Date of Patent: Mar. 18, 2008

(54) METHOD FOR AUTOMATICALLY SETTING TRANSFER MODE IN LINE INTERFACE DEVICE

(75) Inventors: Yoon-Jin Ku, Songnam-shi (KR); Young-Seok Kim, Songnam-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1000 days.

(21) Appl. No.: 10/358,340

(22) Filed: Feb. 5, 2003

(65) Prior Publication Data

US 2003/0161271 A1    Aug. 28, 2003

(30) Foreign Application Priority Data

Feb. 22, 2002    (KR)    ................... 2002-9670

(51) Int. Cl.
*H04L 1/00*    (2006.01)
(52) U.S. Cl. .................................... 370/249
(58) Field of Classification Search ............. 370/241, 370/249, 252, 254
See application file for complete search history.

(56) References Cited

U.S. PATENT DOCUMENTS

| | | | |
|---|---|---|---|
| 5,202,899 A * | 4/1993 | Walsh ..................... 375/222 |
| 5,491,720 A * | 2/1996 | Davis et al. .............. 375/222 |
| 5,579,300 A | 11/1996 | Lee et al. | |
| 5,581,228 A | 12/1996 | Cadieux et al. | |
| 5,896,427 A | 4/1999 | Muntz et al. | |
| 6,157,659 A | 12/2000 | Bird | |

* cited by examiner

Primary Examiner—Frank Duong
(74) Attorney, Agent, or Firm—Robert E. Bushnell, Esq.

(57) ABSTRACT

Disclosed is a method for setting a transfer mode in a line interface device for supporting at least two modes. The method for automatically setting a data transfer mode of a line interface device includes the steps of: a) reading all modes supportable in a line interface mode, generating a test message for requesting a loopback operation according to the order of the read modes, and transmitting the test message via a transmission line; b) upon receiving the test message within a predetermined period of time, setting a transfer mode used for transferring the test message to a data conversion mode of the line interface device, and informing a main controller of the system of the data conversion mode setup; c) repeatedly performing the steps (a) and (b) to set the next mode according to the order of the modes, if the test message for requesting the loopback operation message is not received within the predetermined period of time; and d) transmitting a mode setup denial message to the main controller of the system, if it is impossible to set a mode after a mode setup trial has been applied to all the read modes.

24 Claims, 4 Drawing Sheets

METHOD FOR AUTOMATICALLY SETTING TRANSFER MODE IN LINE INTERFACE DEVICE

CLAIM OF PRIORITY

This application makes reference to, incorporates the same herein, and claims all benefits accruing under 35 U.S.C. §119 from my application METHOD FOR AUTOMATIC SETTING TRANSFER MODE IN LINE INTERFACE DEVICE filed with the Korean Industrial Property Office on 22 Feb. 2002 and there duly assigned Ser. No. 9670/2002.

BACKGROUND OF THE INVENTION

1. Technical Field

The present invention relates to a method for setting a transfer mode in a line interface device, and more particularly to a method for setting a transfer mode in a line interface device for supporting at least two modes.

2. Related Art

Typically, in order to establish communication between systems, one system must use the same data transmission method as a counterpart system in transmitting data to the counterpart system. For this purpose, each system contains a line interface device for data transmission/reception. Such a line interface device is composed of a single hardware unit such as a local area network (LAN) card, a line interface card, a digital service unit (DSU), and a channel service unit (CSU). The above hardware units support at least one line interface mode.

In the meantime, typical systems perform signal transmission/reception based on digital signals. A specific signal grade (Digital Signal X) is used as a term for a successive standard digital transmission rate or level. A transmission rate of 64 kilobits per second (Kbps) equal to a bandwidth for a single phone voice channel is used as a basic rate digital signal 0 (DS0). A T-carrier system widely used in North America and an E-carrier system widely used in Europe are all operated using a basic multiple of digital signal (DS) series (i.e., DS0, DS1, DS2, . . . , DSn).

The DS series will hereinafter be described in detail. The DS series are based on the digital signal X. The DS1 used as a signal of a T-1 carrier transmits 24 DS0 signals using a PCM (Pulse Code Modulation) method and a TDM (Time Division Multiplexing) modulation method. The DS2 multiplexes four DS1 signals at the same time, and transmits the multiplexed four DS1 signals at a rate of 6.312 megabits per second (Mbps). The DS3 used as a signal of a T-3 carrier is 28 times faster than the DS1, namely, it has a transfer rate of 44.736 Mbps.

European digital transmission format of E-1 contains 32 channels having a rate of 64 Kbps in such a way that data can be transmitted at a rate of 2.048 Mbps. E-1 carrier has a higher data transmission rate than the T-1 carrier, because it adapts all eight bits of its own channel to encode signals in a different way from the T-1 carrier. The E-1 carrier and the T-1 carrier may be interconnected for international communications. In more detail, a voice signal is sampled 8,000 times per second in a T-1 carrier system, and each sample is digitalized in 8-bit word. This digitalized sample signal is digitalized in 24 channels at the same time, and thereby a 192-bit frame is transmitted 8,000 times per second. In addition, since each frame is distinguished from other frames by a single bit, each frame is composed of 193 bits. Therefore, a transfer rate of the T-1 carrier can be calculated by the following Equation 1.

192 bits/frame×8,000 frames+8,000 framing Bits    [Equation 1]

Based on the Equation 1, a transfer rate of the T-1 carrier becomes 1.544 Mbps. According to such a T-1 transfer mode using the transfer rate of the Equation 1, twelve DS1 frames produce a SP (Super Frame), and twenty-four DS1 frames produce an ESF (Extended Super Frame). The T-1 transfer mode performs data transmission using an AMI (Alternate Mark Inversion) or B8ZS (Bipolar with Eight Zero Substitution) line coding method. An E-1 transfer mode performs data transmission using a HDB3 (High Density Bipolar Three) method. A T-3 transfer mode performs data transmission using a B3ZS (Bipolar with Three Zero Substitution) line coding method according to a M23 multiplex application frame format or C-bit parity application frame format. Also, an E-3 transfer mode uses a HDB3 line coding method.

As described above, the aforesaid transfer modes are different in a line coding method. Therefore, in the case where a line interface device supports at least two transfer modes among the aforesaid transfer modes, an appropriate mode should be set in the line interface device. Such a transfer mode setup method has a disadvantage in that a system operator must manually set an appropriate transfer mode using a management system in case of using a transmission device or similar systems like this transmission device. In other words, the system operator must manually determine or select a transfer mode of a line interface device in a management system to establish communication with outside devices. Such disadvantageous transfer mode setup should be applied to all the systems having a line interface device for supporting at least two modes in a PC (personal computer) or transmission system, etc. In conclusion, a user or a system operator must inevitably determine a transfer mode in case of rebooting or initially setting up a system.

SUMMARY OF THE INVENTION

Therefore, the present invention has been made in view of the above problems, and it is an object of the present invention to provide a method for automatically setting a mode of a line interface device in a system having the line interface device for supporting at least two modes.

In accordance with the present invention, the above and other objects can be accomplished by the provision of a method for automatically setting a data transfer mode of a line interface device in a system having the line interface device for supporting at least two modes, comprising the steps of: a) reading all modes supportable in a line interface mode, generating a test message for requesting a loopback operation according to the order of the read modes, and transmitting the test message via a transmission line; and b) upon receiving the test message within a predetermined period of time, setting a transfer mode used for transferring the test message to a data conversion mode of the line interface device, and informing a main controller of the system of the data conversion mode setup. Preferably, the method for automatically setting a data transfer mode of a line interface device further includes the step of repeatedly performing the steps (a) and (b) to set the next mode according to the order of the modes, if the test message for requesting the loopback operation message is not received within the predetermined period of time.

Preferably, the method for automatically setting a data transfer mode of a line interface device further includes the step of transmitting a mode setup denial message to the main controller of the system, if it is impossible to set a mode after a mode setup trial has been applied to all the read modes.

In accordance with the principles of the present invention, as embodied and broadly described, the present invention provides a method for selecting modes of a line interface device, the method comprising: (a) reading a plurality of modes supported by a line interface device, the modes being in a predetermined order, and selecting a first mode from among the plurality of modes in dependence upon the predetermined order; (b) generating a test message in dependence upon the selected mode, the test message requesting a loopback operation, transmitting the test message from the line interface device through a transmission line, and, when a loopback message is received within a predetermined period of time by the line interface device in response to the test message, setting a data conversion mode in dependence upon the selected mode; (c) when the loopback message is not received within the predetermined period of time by the line interface device in response to the test message, selecting a next mode from among the plurality of modes in dependence upon the predetermined order; and (d) when the loopback message is not received within the predetermined period of time by the line interface device in response to the test message, repeating steps (b) through (c) until one occurs selected from among (i) the loopback message being received within the predetermined period of time and (ii) every one of the plurality of modes being selected with the loopback message not being received within the predetermined period of time.

In accordance with the principles of the present invention, as embodied and broadly described, the present invention provides a method for selecting modes of a line interface device, the method comprising: (a) reading a plurality of modes supported by a line interface device, the modes being in a predetermined order, and selecting a first mode from among the plurality of modes in dependence upon the predetermined order; (b) generating a test message in dependence upon the selected mode, the test message requesting a loopback operation, transmitting the test message from the line interface device through a transmission line, and, when a loopback message is received within a predetermined period of time by the line interface device in response to the test message, setting a data conversion mode in dependence upon the selected mode; (c) when the loopback message is not received within the predetermined period of time by the line interface device in response to the test message, selecting a next mode from among the plurality of modes in dependence upon the predetermined order; (d) repeating steps (b) through (c) until one occurs selected from among (i) the loopback message being received within the predetermined period of time and (ii) all read modes being selected with the loopback message not being received within the predetermined period of time; and (e) when all read modes have been selected and the loopback message has not been received within the predetermined period of time, transmitting a mode setup denial message.

In accordance with the principles of the present invention, as embodied and broadly described, the present invention provides a method for selecting modes of a line interface device, the method comprising: (a) setting a value of a counter to be a predetermined value; (b) reading a plurality of modes supported by a line interface device, the line interface device being included in a first system, the modes being in a predetermined order, and selecting a first mode from among the plurality of modes in dependence upon the predetermined order; (c) generating a test message in dependence upon the selected mode, the test message requesting a loopback operation, transmitting the test message from the line interface device to a separately located second system through a transmission line, and, when a loopback message is received within a predetermined period of time by the line interface device in response to the test message, setting a data conversion mode in dependence upon the selected mode and informing a main controller of the first system of the set data conversion mode; (d) when the loopback message is not received within the predetermined period of time by the line interface device in response to the test message, selecting a next mode from among the plurality of modes in dependence upon the predetermined order; (e) repeating steps (c) through (d) until one occurs selected from among (i) the loopback message being received within the predetermined period of time and (ii) every one of the plurality of modes being selected with the loopback message not being received within the predetermined period of time; (f) when every one of the plurality of modes has been selected and the loopback message has not been received within the predetermined period of time, incrementing the value of the counter, comparing the incremented value with a predetermined threshold value, and, when the incremented value does not exceed the threshold value repeating steps (b) through (f); and (g) when the incremented value exceeds the incremented value, transmitting a mode setup denial message to the main controller.

In accordance with the principles of the present invention, as embodied and broadly described, the present invention provides a method, comprising: reading a plurality of transfer modes supported by a line interface device, the line interface device being included in a first system having a main controller; selecting a first transfer mode from among the plurality of transfer modes in dependence upon an order of the plurality of transfer modes, generating a first test message in dependence upon the first transfer mode, the first test message requesting a first loopback operation, transmitting the first test message from the line interface device to a separately located second system through a transmission line, and, when a first loopback message is received within a first predetermined period of time by the line interface device in response to the first test message, setting a first data conversion mode in dependence upon the first transfer mode and informing the main controller of the set data conversion mode; and when the first loopback message is not received within the first predetermined period of time by the line interface device in response to the first test message, selecting a next transfer mode from among the plurality of transfer modes in dependence upon the order of the plurality of transfer modes, the next transfer mode being distinguishable from the first transfer mode, generating a next test message in dependence upon the next mode, the next test message requesting a next loopback operation, transmitting the next test message from the line interface device to the second system through the transmission line, and, when a next loopback message is received within a next predetermined period of time by the line interface device in response to the next test message, setting a next data conversion mode in dependence upon the next transfer mode and informing the main controller of the set data conversion mode.

In accordance with the principles of the present invention, as embodied and broadly described, the present invention provides a method for selecting modes of a line interface device, the method comprising: reading a plurality of transfer modes supported by a line interface device, the line interface device being included in a first system having a main controller; selecting a first transfer mode from among the plurality of transfer modes to be a current transfer mode; generating a current test message in dependence upon the current transfer mode, the current test message requesting a current loopback operation; transmitting the current test message from the line interface device of the first system to a separately located second system through a transmission line; and when a current loopback message is received within a predetermined period of time by the line interface device from the second system in response to the current test message, setting a current data conversion mode in dependence upon the current transfer mode and informing the main controller of the set data conversion mode.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF EMBODIMENTS FOR CARRYING OUT THE INVENTION

Figure 1:
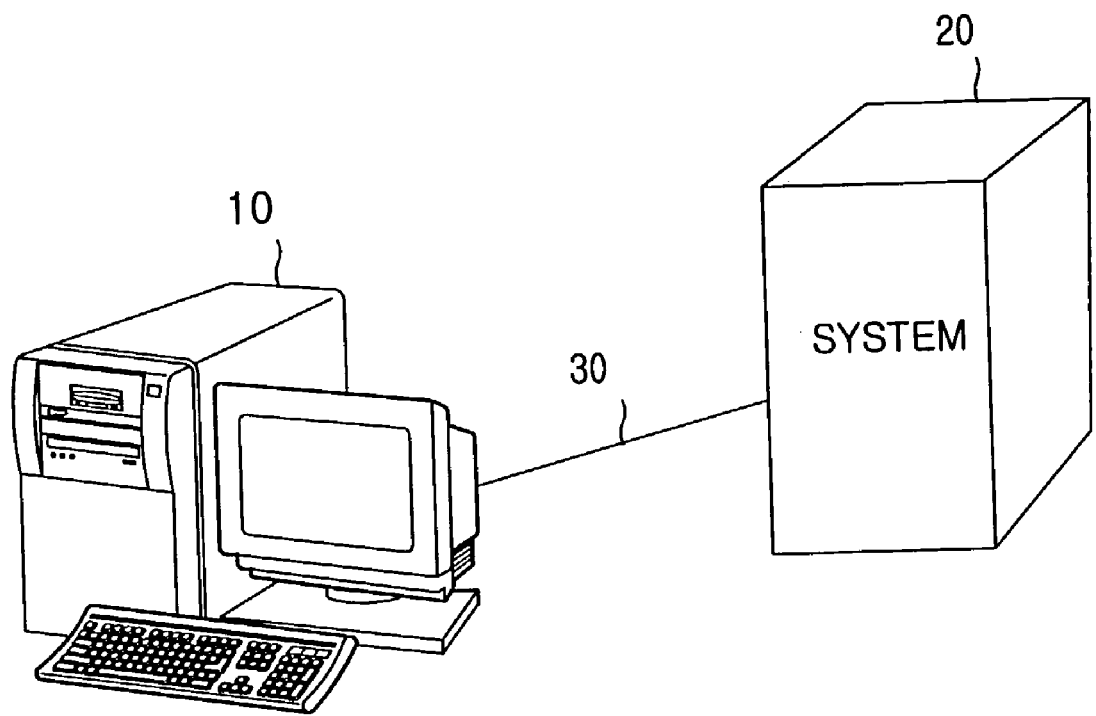
FIG. 1 is a view illustrating a connection configuration between a personal computer (PC) and a system, in accordance with the principles of the present invention.

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Exemplars of recent efforts regarding digital signal transmissions are disclosed, for example, in U.S. Pat. No.6,157,659 to Bird, entitled METHOD OF AND APPARATUS FOR MULTIPLEXING AND DEMULTIPLEXING DIGITAL SIGNAL STREAMS, issued on Dec. 5, 2000, U.S. Pat. No. 5,896,427 to Muntz et al., entitled SYSTEM AND METHOD FOR MAINTAINING NETWORK SYNCHRONIZATION UTILIZING DIGITAL PHASE COMPARISON TECHNIQUES WITH SYNCHRONOUS RESIDUAL TIME STAMPS, issued on Apr. 20, 1999, U.S. Pat. No. 5,581,228 to Cadieux et al., entitled DIGITAL SIGNAL COMPARISON CIRCUIT IN A PERFORMANCE MONITORING AND TEST SYSTEM, issued on Dec. 3, 1996, and U.S. Pat. No. 5,579,300 to PRIVATE AUTOMATIC BRANCH EXCHANGE FOR INTEGRATED SERVICES DIGITAL NETWORK, issued on Nov. 26, 1996.

While these contemporary efforts contain merit, it is my observation that further improvements can also be contemplated.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a view illustrating a connection configuration between a personal computer (PC) and a system in accordance with the present invention. For the convenience of description and better understanding of the present invention, it is assumed that a personal computer (PC) contains a line interface device for supporting at least two modes.

Referring to FIG. 1, a personal computer (PC) 10 contains a line interface device. The personal computer (PC) 10 is typically connected to a predetermined system 20 via a communication line 30. This system 20 may be a transmission system or exchange system, etc. Also, the system 20 may be other server computer or another computer.

In accordance with the present invention, a line interface device of the personal computer (PC) 10 generates a loopback signal in its own initial setup process, and transmits the loopback signal to the system 20. Then, the line interface device automatically sets a mode using a return message from the system 20. Operations of the line interface device will be described in detail with reference to FIGS. 2 through 4.

Figure 2:
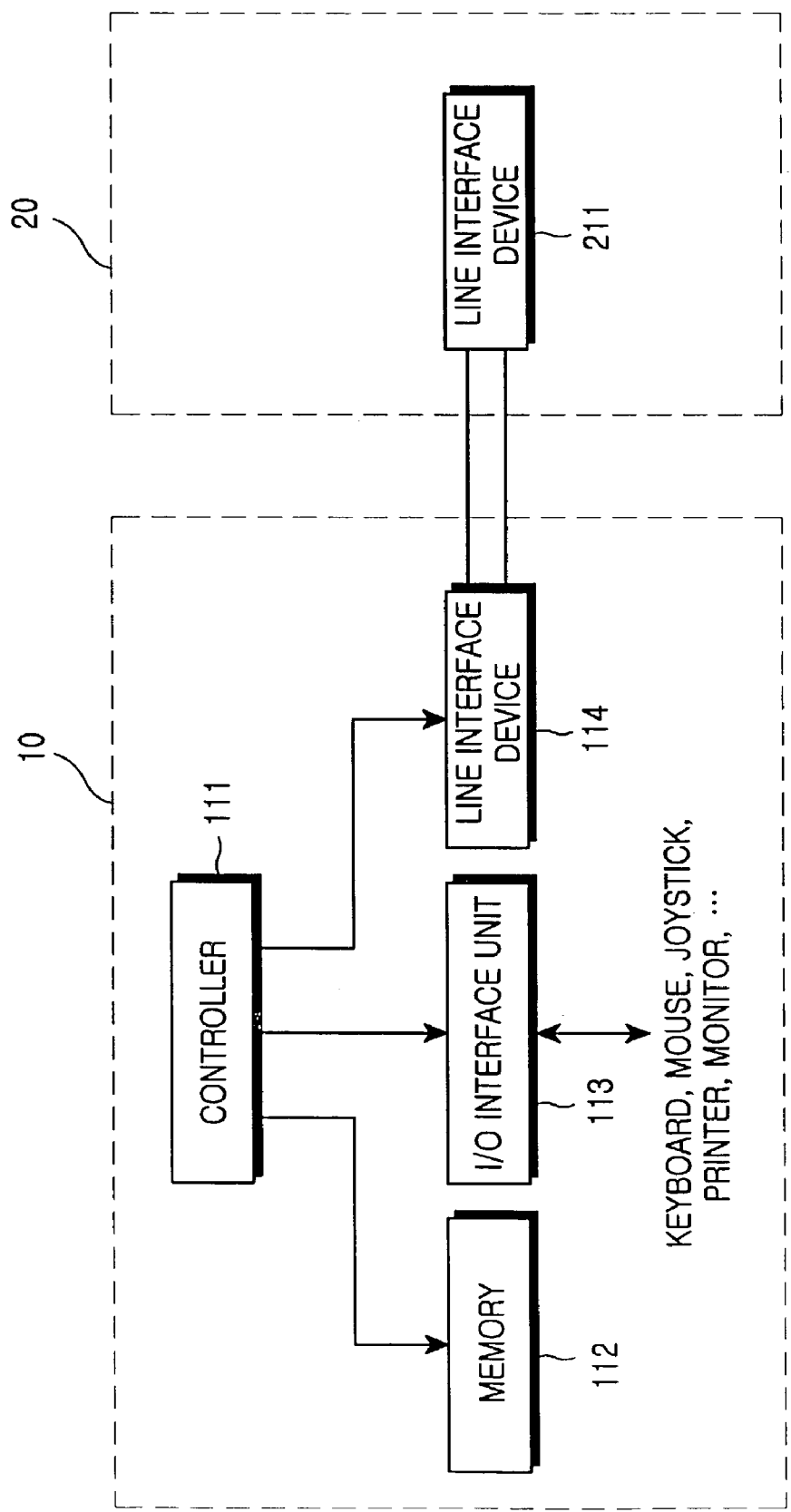
FIG. 2 is a block diagram illustrating a personal computer (PC) having a line interface device and another line interface device contained in a system, in accordance with the principles of the present invention.

FIG. 2 is a block diagram illustrating a personal computer (PC) having a line interface device and another line interface device contained in a system in accordance with a preferred embodiment of the present invention.

Referring to FIG. 2, a personal computer (PC) 10 includes a controller 111, a memory 112, an I/O (Input/Output) interface unit 113, and a line interface device 114. The personal computer (PC) 10 may include elements other than the above elements, but their description will be omitted below for the convenience of description and better understanding of the present invention. The controller 111 may be comprised of a microprocessor and the like. The memory 112 contains a first storage area for storing an operation program, a second storage area for storing data generated in operating the program, and a third storage area for storing user data generated by a user. The memory 112 may be comprised of a read only memory (ROM), a random access memory (RAM), or a hard disk, etc. The I/O interface unit 113 establishes a data interface among an input unit and output unit of a personal computer (PC), and a controller 111. That is, various kinds of peripheral devices such as a keyboard, a mouse, a joystick, a printer, and a monitor, etc. may be connected to the I/O interface unit 113. Also, a line interface unit 114 performs data transmission/reception based on a predetermined mode. In the case where the line interface unit 114 is initially driven or requires a mode setup operation, it sequentially reads a plurality of predetermined modes, and then transmits a mode test message via a communication line 30 shown in FIG. 3. The line interface unit 114 sets a mode using feedback information being fed back via the communication line 30. Such modes and operation generated during a mode setup process will hereinafter be described with reference to FIGS. 3 and 4.

The system 20 also contains a line interface 211, as shown in FIG. 2. The line interface unit 211 may be a line interface unit for supporting at least two modes at the same time, or may be a fixed line interface unit for supporting only one mode.

Figure 3:
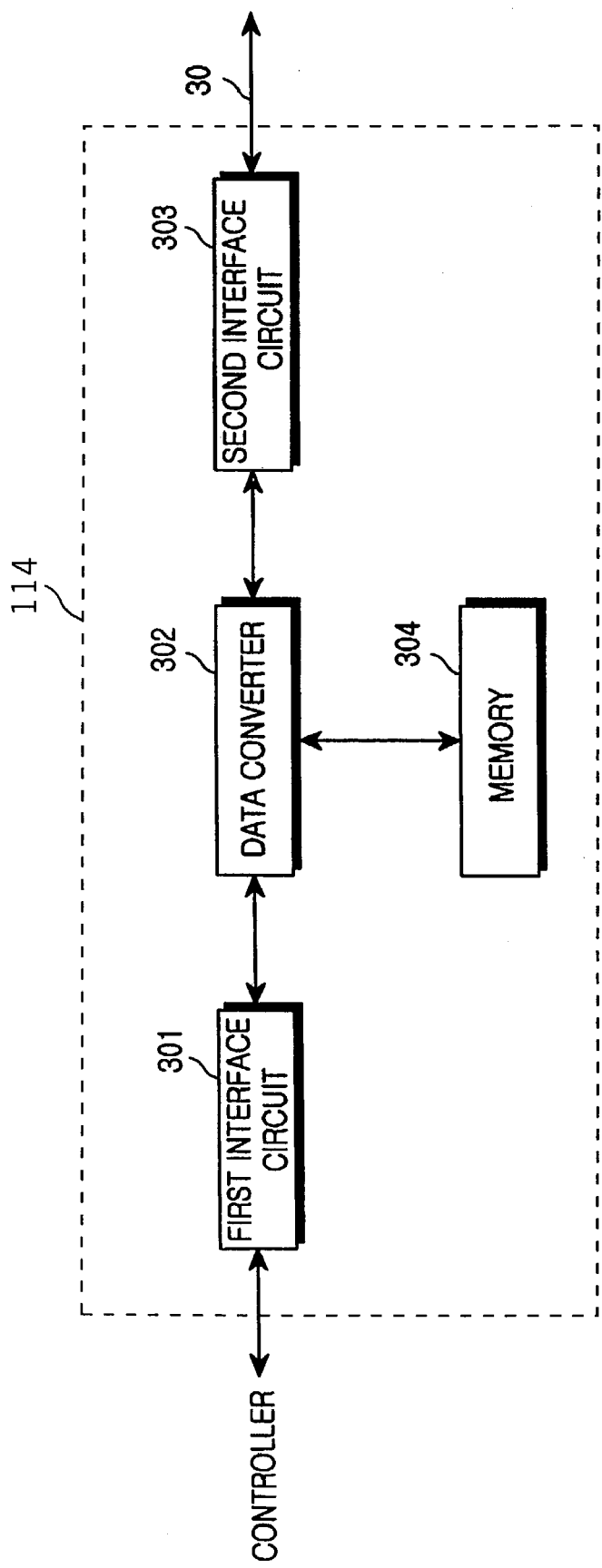
FIG. 3 is a view illustrating a block diagram of a line interface device, in accordance with the principles of the present invention.

FIG. 3 is a view illustrating a block diagram of a line interface device having a plurality of inside function blocks in accordance with a preferred embodiment of the present invention. Referring to FIG. 3, a line interface device 114 is comprised of a first interface circuit 301, a data converter 302, a second interface circuit 303, and a memory 304. The first interface circuit 301 is connected to a controller 111, and performs operations for the circuit matching. Namely, impedance matching between an input signal and an output signal, and performs operations initiated by the output data buffering. The second interface circuit 303 establishes impedance matching with a transmission line 30, and performs buffering operations of transmission data and reception data. A memory 304 stores data required for a transfer mode, and may store an operation program of the data converter 302 and data needed to initiate the data converter 302. Such data transfer modes stored in the memory 304 can be readily represented as the following Table 1.

TABLE 1

| Mode No(t) | Line Interface Type | Line Code | Framing Format | Loopback Type |
|---|---|---|---|---|
| 1 | T3 | B3ZS | M23 Multiplex Application | Payload Loopback |
| 2 | T3 | B3ZS | C-bit Parity Application | Line Loopback |
| 3 | E3 | HDB3 | E3 | Line Loopback |
| ... | ... | ... | ... | ... |

The Table 1 depicts data generated by a line interface unit for supporting at least three modes. The line interface device according to the present invention will hereinafter be described in more detail with reference to the Table 1. The term "Mode No(t)" indicates the data storage order of a memory, and thereby data is stored in the memory in this order shown in the Table 1. The term "Line Interface Type" indicates a type of lines such as a T1, E1, T3, and E3, etc. The term "Line Code" indicates a coding method. The term "Framing Format" indicates a method for constituting a frame. Finally, the term "Loopback Type" indicates a method for executing a loopback operation.

The data converter 302 performs a mode setup operation of the line interface device 114 in the case where the line interface device 114 is initially driven or requests a mode setup. Such a mode setup operation generates a loopback message according to the order of modes as shown in the Table 1, and may set a mode according to a feedback message generated after transmitting the loopback message to the controller 111. If the mode setup is completed, then the data converter 302 converts data to be transmitted to a transmission line 30 into data of the determined mode. If the data converter 302 receives data via the transmission line 30, then it performs a data conversion for transferring the data to the controller 111 according to the determined mode.

Figure 4:
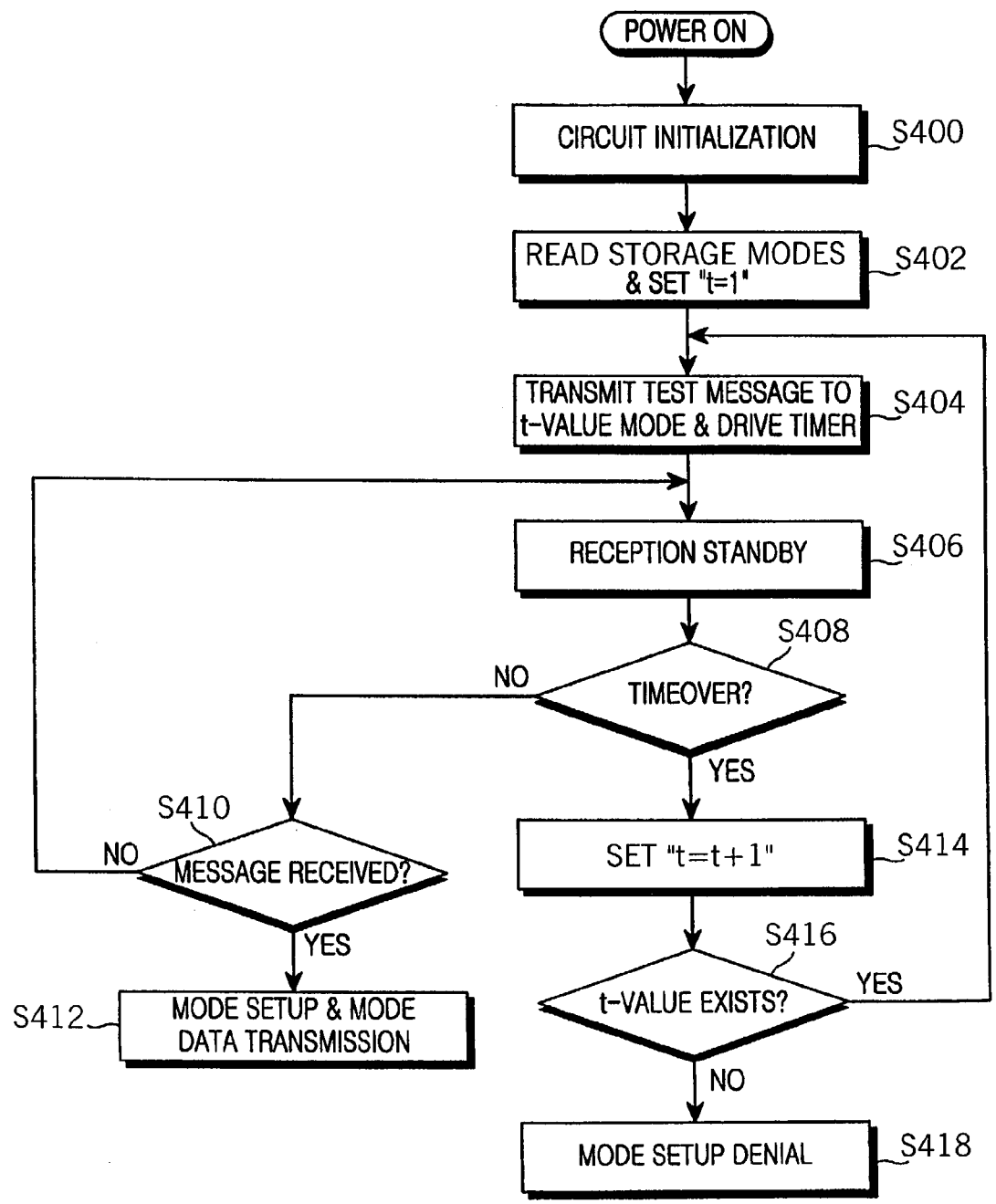
FIG. 4 is a flow chart illustrating a control procedure in case of automatically setting a mode in a line interface device, in accordance with the principles of the present invention.

FIG. 4 is a flow chart illustrating a control procedure in case of automatically setting a mode in a line interface device in accordance with a preferred embodiment of the present invention. A method for automatically setting a data conversion mode in a line interface device according to the present invention will hereinafter be described in detail with reference to FIGS. 1 through 4.

At step S400, in case of powering on the line interface device 114, the line interface device 114 performs circuit initialization. Such initialization operation is well known in the art so that its detailed description will be omitted below. When the circuit initialization is completed at step S400, then, at step S402, the data converter 302 reads a plurality of storage modes stored in a memory 304 as shown in the Table 1 and then sets a storage mode read value (t) to "1". By setting the storage mode read value (t) to "1", the data converter 302 is capable of sequentially reading transfer modes ranging from an initial transfer mode to the last transfer mode, and is capable of executing a test for a mode setup in order of the transfer modes.

After setting a variable t to "1" at step S402, then, at step S404, the data converter 302 transmits a test message in accordance with a mode corresponding to the variable t of "1." In case of initially transmitting the test message, the variable t is set to "1" because the initial transmission operation is provided after the step S402. Therefore, as shown in the Table 1, a test message for performing a loopback operation is produced using a line interface type of "T3", a line code of "B3ZS", a frame format of "M23 Multiplex Application", and a loopback type of "Payload Type", and then transmitted. Substantially simultaneously, the data converter 302 drives a timer having a predetermined driving time.

At step S406 the data converter 302 awaits reception of a loopback test message in response to the test message transmitted at step S404. At step S408, the data converter 302 determines whether a time of the timer driven at step S404 has expired (i.e., a timeover state). When it is determined at step S408 that the timeover state of the timer is detected (i.e., the timer has expired), the step S414 is performed. When it is determined at step S408 that the timeover state of the timer is not detected (i.e., the time has not expired), the step S410 is performed. At step S410, the data converter 302 determines whether a predetermined message is received. Herein, the predetermined message is the test message requesting a loopback operation. Such message loopback test adopts a message received in the case where a current transfer mode is equal to a transfer mode of a counterpart system, and this message is called a loopback message. When the data converter 302 receives such a loopback message at step S410, then step S412 is performed. At step S412, data converter 302 sets a current mode and transmits data of the determined mode to the controller 111.

On the other hand, if the loopback message is not received in the data converter 302 at step S410, it means no timeover and no loopback message, and therefore step S406 is performed next, thereby waiting reception of the loopback message at the step S406.

At step S412, the current transfer mode has been established to be a viable method of communication across the transmission line 30. Therefore, at step S412, the current transfer mode is set, or adopted, for future data transfers and future communication. The current transfer mode corresponds to the current value of t. At step S412, when the current transfer mode has been proven to be a viable method of communication for personal computer 10 and system 20, then a corresponding data conversion mode is set, or adopted. When the data conversion mode is set at step S412, then data can be transmitted from computer 10 to system 20 through line 30. The transfer mode utilized for the test message transmitted at step S404 can be considered to be a "test transfer mode" or "current transfer mode." At step S412, the "current transfer mode" is adopted, and thus the actual transfer mode that is going to be used for data communication is set to conform to the "current transfer mode" at step S412. And, at step S412, the data conversion mode is set to conform to the "current transfer mode." The message received at step S410 can be referred to as a loopback message or response message. The loopback message is sent in response to the current test message sent at step S404.

In the case where a timer has expired (i.e., a timeover state) at step S408, then, at step S414, the data converter 302 increases a value of t by "1." Since the data converter 302 previously set the value of t to "1" at step S402, the data converter 302 causes the value of t to be "2" at step S414 on condition that a transfer mode is not determined in initial operations of the data converter 302. At step S416, the data converter 302 determines whether data having the t-value of "2" exists in a plurality of mode numbers "Mode No(t)" shown in the Table 1, read from the memory 304. That is, the data converter 302 determines at step S416 whether other modes exist which have not yet been tested. If the t-value exists in the step S416, i.e., if other modes not tested exist in the step S416, the data converter 302 returns to step S404. Therefore, if a transfer mode is not determined, the data converter 302 sequentially generates a test message requesting a loopback operation of all modes each having a value of t, and then transmits the test message.

However, in the case where it is impossible for the data converter 302 to set a mode in the memory 304 even though the aforementioned steps are performed, i.e., in the case where a program goes to the step S418 from the step S416, the data converter 302 cannot perform a mode setup operation. In this case, a system is not connected to a transmission line 30, or is connected to a mode not supported by the line interface device.

Also, it is assumed that the t-value is repeated only once in a preferred embodiment of the present invention. That is, the t-value is tested only once in order of "0→1→2→. . . ", but such test may be repeated at least two times in order of "0→1→2→. . . ". In this case, a counter for counting the total number of execution times of the t-value should be contained in the line interface device 114, and the line interface device 114 should further require a method for resetting a counted value of the counter during its own initial driving time. Further, in the case where the counted value of the counter is less than a threshold value, the above steps (i.e., the t-value test steps) should be repeated continuously. Therefore, the counter for counting the total execution times of the t-value needs to be reset at step S402 in FIG. 4. In addition, an additional test step for determining whether the total execution times of the t-value is greater than the threshold value may be inserted between the step S416 and the step S418. So, if the total execution times of the t-value is greater than the threshold value, then step S418 is performed after the additional test step. If the total execution times of the t-value is less than the threshold value, then step S404 is performed after the additional test step.

The aforementioned description has been explained using a personal computer (PC) as an example. The personal computer (PC) does not set a transfer mode whenever it is powered on, but sets a transfer mode in the case where the line interface device is initially mounted to the personal computer (PC), i.e., in the case where there is a request signal from a system. In case of a transmission system, an exchange system, and other data transmission systems such as a small-sized system, a middle-sized system, and a large-sized system, they always receive a power-supply voltage. Namely, provided that a particular error or malfunction is not generated and systems are continuously powered on, the aforesaid control steps shown in FIG. 4 are performed.

In the meantime, in the case where there is a request signal from a main controller of a system, the present invention can properly control the request signal. Namely, if there is a mode setup request signal from a system such as a personal computer (PC), the line interface device performs a standby mode instead of performing the step S400 until it receives the mode setup request signal from the system. If the line interface device receives the mode setup request signal from the system, then steps after the step S402 are performed automatically.

As apparent from the above description, a method for automatically setting a transfer mode in a line interface device in accordance with the present invention enhances a user's convenience in that a user need not manually set a line interface mode whenever an electronic component is newly mounted to a communication system or the communication system is powered on.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method for selecting modes of a line interface device, the method comprising:
  (a) reading a plurality of modes supported by a line interface device, and selecting a first mode from among said modes in dependence upon a predetermined order;
  (b) generating a test message in dependence upon the selected first mode, the test message requesting a loopback operation, transmitting the test message from the line interface device through a transmission line, and, when a first loopback message is received within a predetermined period of time by the line interface device in response to the test message, setting a data conversion mode in dependence upon the selected first mode; and (c) when the loopback message is not received within the predetermined period of time by the line interface device in response to the test message, transmitting a mode setup denial message.

2. The method of claim 1, further comprising: transmitting data through the transmission line in dependence upon the set data conversion mode.

3. The method of claim 1, said transmitting of the test message comprising transmitting the test message from a first system including the line interface device, to a separately located second system; and said setting of the data conversion mode further comprising informing a main controller of the first system of the set data conversion mode.

4. The method of claim 1, further comprising:

(d) when the first loopback message is not received within the predetermined period of time, selecting a second mode among all supportable modes in dependence upon the predetermined order; and (e) when the second loopback message is not received within the predetermined period of time, repeating steps (b) thru (c) until one occurs selected from among (i) the loopback message being received within the predetermined period of time and (ii) every one of the plurality of modes being selected with the loopback message not being received within the predetermined period of time.

5. The method of claim 1, said transmitting of the mode setup denial message comprising transmitting the mode setup denial message to the main controller.

6. The method of claim 1, further comprising:

before performing step (a), setting a value of a counter to be a predetermined initial value.

7. The method of claim 6, further comprising:

(d) when every one of the plurality of modes has been selected and the loopback message has not been received within the predetermined period of time, incrementing the value of the counter, comparing the value of the counter with a predetermined threshold value, and, when the value of the counter does not exceed the threshold values repeating steps (a) through (c); and (e) when the value of the counter exceeds the threshold value, transmitting the mode setup denial message.

8. The method of claim 7, said transmitting of the test message comprising transmitting the test message from a first system, including the line interface device, to a separately located second system;

said setting of the data conversion mode comprising informing a main controller of the first system of the set data conversion mode; and said transmitting of the mode setup denial message comprising transmitting the mode setup denial message to the main controller.

9. A method for selecting modes of a line interface device, the method comprising:

(a) reading a plurality of modes supported by a line interface device, the modes being in a predetermined order, and selecting a first mode from among the plurality of modes in dependence upon the predetermined order;

(b) generating a test message in dependence upon the selected mode, the test message requesting a loopback operation, transmitting the test message from the line interface device through a transmission line, and, when a loopback message is received within a predetermined period of time by the line interface device in response to the test message, setting a data conversion mode in dependence upon the selected mode;

(c) when the loopback message is not received within the predetermined period of time by the line interface device in response to the test message, selecting a next mode from among the plurality of modes in dependence upon the predetermined order;

(d) repeating steps (b) and (c) until one occurs selected from among (i) the loopback message being received within the predetermined period of time and (ii) all read modes being selected with the loopback message not being received within the predetermined period of time; and (e) when all read modes have been selected and the loopback message has not been received within the predetermined period of time, transmitting a mode setup denial message.

10. The method of claim 9, the plurality of modes comprising a plurality of transfer modes, said transmitting of the test message from the line interface device through the transmission line comprising transmitting the test message to a separately located system.

11. The method of claim 10, further comprising:

transmitting data from the line interface device through the transmission line in dependence upon the set data conversion mode.

12. A method for selecting modes of a line interface device; the method comprising:

(a) setting a value of a counter to a predetermined value;

(b) reading a plurality of modes supported by a line interface device, the line interface device being included in a first system, the modes being in a predetermined order, and selecting a first mode from among the plurality of modes in dependence upon the predetermined order;

(c) generating a test message in dependence upon the selected first mode, the test message requesting a loopback operation, transmitting the test message from the line interface device to a separately located second system through a transmission line, and, when a loopback message is received within a predetermined period of time by the line interface device in response to the test message, setting a data conversion mode in dependence upon the selected first mode and informing a main controller of the first system of the set data conversion mode;

(d) when the loopback message is not received within the predetermined period of time by the line interface device in response to the test message, selecting a next mode from among the plurality of modes in dependence upon the predetermined order;

(e) repeating steps (c) and (d) until one occurs selected from among (i) the loopback message being received within the predetermined period of time and (ii) every one of the plurality of modes being selected with the loopback message not being received within the predetermined period of time;

(f) when every one of the plurality of modes has been selected and the loopback message has not been received within the predetermined period of time, incrementing the value of the counter, comparing the value of the counter with a predetermined threshold value, and, when the value of the counter does not exceed the threshold value, repeating steps (b) thru (f); and (g) when the value of the counter exceeds the incremented value, transmitting a mode setup denial message to the main controller.

13. The method of claim 12, the plurality of modes comprising a plurality of transfer modes.

14. The method of claim 13, further comprising:
transmitting data from the first system to the second system through the transmission line in dependence upon the set data conversion mode.

15. A method, comprising the steps of:
reading a plurality of transfer modes supported by a line interface device, the line interface device being included in a first system having a main controller;
selecting a first transfer mode in dependence upon an order of transfer modes, generating a first test message in dependence upon the first transfer mode, the first test message requesting a first loopback operation, transmitting the first test message to a separately located second system through a transmission line, and, when a first loopback message is received within a first predetermined period of time in response to the first test message, setting a first data conversion mode in dependence upon the first transfer mode and informing the main controller of the first data conversion mode; and
when the first loopback message is not received within the first predetermined period of time in response to the first test message, selecting a second transfer mode in dependence upon the order of said transfer modes, generating a second test message in dependence upon the second mode, the second test message requesting a second loopback operation, transmitting the second test message to the second system and, when a second loopback message is received within a second predetermined period of time in response to the second test message, setting a second data conversion mode in dependence upon the second transfer mode and informing the main controller of the set second data conversion mode; and
when the second loopback message is not received within the second predetermined period of time, transmitting a mode setup denial message to the main controller.

16. The method of claim 15, further comprising:
transmitting data from the first system to the second system in dependence upon the set data conversion mode.

17. A method for selecting modes of a line interface device, the method comprising:
reading a plurality of transfer modes supported by a line interface device, the line interface device being included in a first system having a main controller;
selecting a first transfer mode from among the plurality of transfer modes;
generating a first test message in dependence upon a, current transfer mode, the first test message requesting a first loopback operation;
transmitting the first test message from the line interface device of the first system to a separately located second system through a transmission line;
when a the first loopback message is received within a predetermined period of time from the second system in response to the first test message, setting a first data conversion mode in dependence upon the first transfer mode and informing the main controller of the set data conversion; and
when the first loopback message is not received within the predetermined period of time, transmitting a mode setup denial message to the main controller.

18. The method of claim 17, said selecting of the first transfer mode being in accordance with a predetermined order of the plurality of transfer modes.

19. The method of claim 18, said setting further comprising transmitting data from the first system to the second system in dependence upon the set data conversion mode.

20. The method of claim 19, further comprising:
when the first loopback message is not received within the predetermined period of time, selecting a second transfer mode from among the plurality of transfer modes to be the current transfer mode, said selecting of the second transfer mode being in accordance with the predetermined order of the plurality of transfer modes; and
generating and transmitting a second test message according to the second transfer mode and, when a second loopback message corresponding to the second test message is received within the predetermined period of time from the second system in response to the second test message, performing said setting and informing.

21. The method of claim 20, further comprising:
when the second loopback message is not received within the predetermined period of time, selecting a third transfer mode in accordance with the predetermined order of the plurality of transfer modes; and
performing said generating, transmitting, and setting according to the third transfer mode.

22. The method of claim 21, further comprising, when each one of the plurality of transfer modes has been selected, and the loopback message according to respective transfer modes has not been received within the predetermined period of time, transmitting a mode setup denial message to the main controller.

23. The method of claim 21, further comprising:
when a current loopback message is not received within the predetermined period of time, repeatedly performing said selecting of a fourth transfer mode, said generating, said transmitting, and said setting.

24. The method of claim 23, further comprising:
when a loopback message according to the fourth mode is received within the predetermined period of time, discontinuing said repeated performing of said selecting of a next transfer mode, said generating, said transmitting, and said setting; and
when each one of the plurality of transfer modes has been selected, and a loopback message according to the next transfer mode is not received, transmitting a mode setup denial message to the main controller and discontinuing performing of said selecting of a transfer mode, said generating, said transmitting, and said setting.

* * * * *